US011903452B2

(12) United States Patent
Stillman et al.

(10) Patent No.: US 11,903,452 B2
(45) Date of Patent: Feb. 20, 2024

(54) AUTOMATED FOOTWEAR LACING SYSTEMS, DEVICES, AND TECHNIQUES

(71) Applicant: NIKE, Inc., Beaverton, OR (US)

(72) Inventors: Martine Stillman, Beaverton, OR (US); Bret Richmond, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/089,097

(22) Filed: Dec. 27, 2022

(65) Prior Publication Data
US 2023/0138617 A1 May 4, 2023

Related U.S. Application Data

(62) Division of application No. 15/993,914, filed on May 31, 2018, now Pat. No. 11,559,108.
(Continued)

(51) Int. Cl.
A43C 11/16 (2006.01)
B65H 75/36 (2006.01)
(Continued)

(52) U.S. Cl.
CPC .............. A43C 11/165 (2013.01); A43B 3/34 (2022.01); A43C 1/00 (2013.01); A43C 7/08 (2013.01); B65H 59/00 (2013.01); B65H 69/00 (2013.01); B65H 75/368 (2013.01); B65H 75/4428 (2013.01); B65H 75/4484 (2013.01);
(Continued)

(58) Field of Classification Search
CPC ....... A43C 11/165; A43C 11/008; A43C 1/00; A43C 7/08; A43B 3/34; A43B 3/38; A43B 11/00; B65H 75/368; B65H 2403/46; F16G 11/00; F16G 11/106; F16G 11/12; F16G 11/14; F16H 1/2863; Y10T 24/3724
See application file for complete search history.

(56) References Cited

U.S. PATENT DOCUMENTS 5,152,038 A 10/1992 Schoch
5,600,874 A 2/1997 Jungkind
(Continued)

FOREIGN PATENT DOCUMENTS

CA 2998546 4/2017
CN 1096572 12/1994
(Continued)

OTHER PUBLICATIONS

"International Application Serial No. PCT US2018 035341, International Search Report dated Nov. 30, 2018", 5 pgs.
(Continued)

Primary Examiner — Robert Sandy
Assistant Examiner — Louis A Mercado
(74) Attorney, Agent, or Firm — Schwegman, Lundberg & Woessner, P.A.

(57) ABSTRACT

In an example, a lacing engine apparatus can include a housing and a drivetrain. The housing can be securable within a footwear article. The drivetrain can include a motor, a sun gear, a planet gear, a rotating ring gear, and a spool. The spool can be secured to the ring gear and can be rotatable therewith. The spool can be configured to control a lace of the footwear article and can be configured to wind the lace as the ring gear rotates in a first direction.

12 Claims, 8 Drawing Sheets

Related U.S. Application Data

(60) Provisional application No. 62/513,213, filed on May 31, 2017.

(51) Int. Cl.
| | | |
|---|---|---|
| *B65H 69/00* | (2006.01) | |
| *B65H 75/44* | (2006.01) | |
| *F16G 11/00* | (2006.01) | |
| *F16H 1/28* | (2006.01) | |
| *A43B 3/34* | (2022.01) | |
| *A43C 1/00* | (2006.01) | |
| *A43C 7/08* | (2006.01) | |
| *B65H 59/00* | (2006.01) | |
| *F16G 11/10* | (2006.01) | |
| *F16G 11/12* | (2006.01) | |
| *F16G 11/14* | (2006.01) | |

(52) U.S. Cl.
CPC ............ *F16G 11/00* (2013.01); *F16H 1/2863* (2013.01); *B65H 2403/46* (2013.01); *B65H 2511/411* (2013.01); *B65H 2515/31* (2013.01); *B65H 2553/20* (2013.01); *B65H 2701/39* (2013.01); *F16G 11/106* (2013.01); *F16G 11/12* (2013.01); *F16G 11/14* (2013.01); *Y10T 24/34* (2015.01); *Y10T 24/3724* (2015.01)

(56) References Cited

U.S. PATENT DOCUMENTS

| | | | |
|---|---|---|---|
| 5,934,599 A | 8/1999 | Hammerslag | |
| 6,289,558 B1 | 9/2001 | Hammerslag | |
| 7,076,843 B2 | 7/2006 | Sakabayashi | |
| 7,591,050 B2 | 9/2009 | Hammerslag | |
| 7,662,122 B2 | 2/2010 | Sterling | |
| 7,721,468 B1 | 5/2010 | Johnson et al. | |
| 9,248,040 B2 | 2/2016 | Soderberg et al. | |
| 9,532,893 B2 | 1/2017 | Beers et al. | |
| 9,578,926 B2 | 2/2017 | Alt et al. | |
| 10,070,680 B2* | 9/2018 | Molyneux | A43B 3/34 |
| 10,201,212 B2* | 2/2019 | Beers | A43C 11/165 |
| 10,238,180 B2* | 3/2019 | Beers | A43B 3/34 |
| 10,342,293 B2* | 7/2019 | Beers | A43C 11/165 |
| 10,405,609 B2* | 9/2019 | Orand | F16H 1/20 |
| 10,568,381 B2* | 2/2020 | Walker | A43B 7/088 |
| 10,575,592 B1* | 3/2020 | Jones | F16G 11/12 |
| 10,624,423 B2* | 4/2020 | Orand | A43C 7/00 |
| 10,660,405 B2* | 5/2020 | Schneider | A43C 7/00 |
| 10,660,406 B2* | 5/2020 | Beers | A43C 11/165 |
| 10,834,999 B2* | 11/2020 | Orand | A43B 13/04 |
| 11,026,481 B2* | 6/2021 | Walker | A43B 3/0031 |
| 11,064,768 B2* | 7/2021 | Walker | A43C 11/00 |
| 11,559,108 B2 | 1/2023 | Stillman et al. | |
| 2002/0095750 A1 | 7/2002 | Hammerslag | |
| 2003/0150135 A1 | 8/2003 | Liu | |
| 2003/0204938 A1 | 11/2003 | Hammerslag | |
| 2006/0156584 A1 | 7/2006 | Johnson | |
| 2008/0066346 A1 | 3/2008 | Hammerslag et al. | |
| 2008/0301919 A1 | 12/2008 | Ussher | |
| 2008/0307673 A1 | 12/2008 | Johnson | |
| 2010/0139057 A1 | 6/2010 | Soderberg et al. | |
| 2010/0299959 A1 | 12/2010 | Hammerslag et al. | |
| 2011/0266384 A1 | 11/2011 | Goodman et al. | |
| 2011/0303782 A1 | 12/2011 | Hu et al. | |
| 2014/0068838 A1 | 3/2014 | Beers et al. | |
| 2014/0082963 A1 | 3/2014 | Beers | |
| 2015/0089835 A1 | 4/2015 | Hammerslag et al. | |
| 2015/0230560 A1 | 8/2015 | Chen | |
| 2015/0250268 A1 | 9/2015 | Alt et al. | |
| 2017/0055626 A1 | 3/2017 | Rushbrook | |
| 2018/0343978 A1 | 12/2018 | Stillman et al. | |

FOREIGN PATENT DOCUMENTS

| | | |
|---|---|---|
| CN | 2613167 | 4/2004 |
| CN | 1618363 | 5/2005 |
| CN | 1758862 | 4/2006 |
| CN | 101193568 | 6/2008 |
| CN | 101784210 | 7/2010 |
| CN | 102132983 | 7/2011 |
| CN | 103153112 | 6/2013 |
| CN | 103476288 | 12/2013 |
| CN | 104585975 | 5/2015 |
| CN | 104839942 | 8/2015 |
| CN | 105581438 | 5/2016 |
| CN | 105722419 | 6/2016 |
| CN | 111315249 | 6/2020 |
| CN | 111615344 | 9/2020 |
| CN | 111629625 | 9/2020 |
| CN | 113662314 | 11/2021 |
| CN | 111629625 | 12/2021 |
| CN | 111615344 | 4/2022 |
| CN | 114304812 | 4/2022 |
| CN | 111315249 | 7/2022 |
| CN | 115104810 | 9/2022 |
| CN | 113662314 B | 5/2023 |
| EP | 3629820 | 4/2020 |
| FR | 3038815 | 1/2017 |
| JP | 3165581 | 1/2011 |
| JP | 2016039921 | 3/2016 |
| KR | 20150131485 | 11/2015 |
| TW | 201429420 | 8/2014 |
| WO | 2010059989 | 5/2010 |
| WO | 2015042216 | 3/2015 |
| WO | 2015054722 | 4/2015 |
| WO | 2016191123 | 12/2016 |
| WO | 2016195957 | 12/2016 |
| WO | 2018222805 | 12/2018 |
| WO | 2018222807 | 12/2018 |
| WO | 2018222836 | 12/2018 |

OTHER PUBLICATIONS

"International Application Serial No. PCT US2018 035341, Written Opinion dated Nov. 30, 2018", 10 pgs.

"International Application Serial No. PCT US2018 035287, International Search Report dated Nov. 30, 2018", 4 pgs.

"International Application Serial No. PCT US2018 035287, Written Opinion dated Nov. 30, 2018", 4 pgs.

"International Application Serial No. PCT US2018 035289, International Search Report dated Jan. 2, 2019", 5 pgs.

"International Application Serial No. PCT US2018 035289, Written Opinion dated Jan. 2, 2019", 6 pgs.

"International Application Serial No. PCT US2018 035287, International Preliminary Report on Patentability dated Dec. 12, 2019", 6 pgs.

"International Application Serial No. PCT US2018 035289, International Preliminary Report on Patentability dated Dec. 12, 2019", 8 pgs.

"International Application Serial No. PCT US2018 035341, International Preliminary Report on Patentability dated Dec. 12, 2019", 12 pgs.

"European Application Serial No. 18809615.0, Response to Communication Pursuant to Rules 161 and 162 filed Jun. 25, 2020", 11 pgs.

"European Application Serial No. 18810542.3, Response to Communication Pursuant to Rules 161 and 162 filed Jun. 25, 2020", 10 pgs.

"European Application Serial No. 18810465.7, Response to Communication pursuant to Rules 161 and 162 filed Jun. 25, 2020", 12 pgs.

"European Application Serial No. 18810542.3, Extended European Search Report dated Feb. 1, 2021", 7 pgs.

"U.S. Appl. No. 15/993,914, Restriction Requirement dated Mar. 10, 2021", 5 pgs.

"European Application Serial No. 18810465.7, Extended European Search Report dated Apr. 9, 2021", 7 pages.

(56) References Cited

OTHER PUBLICATIONS

"Chinese Application Serial No. 201880048175.6, Notification to Make Divisional Application dated Mar. 31, 2021", With English translation, 8 pages.
"European Application Serial No. 18809615.0, Communication pursuant to Rule 164(1) EPC dated Apr. 16, 2021", 13 pages.
"Chinese Application Serial No. 201880048164.8, Office Action dated Apr. 12, 2021", With English translation, 13 pages.
"Chinese Application Serial No. 201880048319.8, Office Action dated May 7, 2021", With English translation, 23 pages.
"European Application Serial No. 18809615.0, Extended European Search Report dated Jul. 27, 2021", 12 pages.
"U.S. Appl. No. 15/993,914, Response filed Aug. 6, 2021 to Restriction Requirement dated Mar. 10, 2021", 6 pgs.
"Chinese Application Serial No. 201880048175.6, Response filed Aug. 16, 2021 to Notification to Make Divisional Application dated Mar. 31, 2021", With current English claims, 9 pages.
"Chinese Application Serial No. 201880048164.8, Response Filed Aug. 12, 2021 to Office Action dated Apr. 12, 2021", With English claims, 10 pages.
"Chinese Application Serial No. 201880048164.8, Response filed Sep. 9, 2021 to Examiner Telephone Interview", w English claims, 8 pgs.
"European Application Serial No. 18810542.3, Response filed Aug. 18, 2021 to Extended European Search Report dated Feb. 1, 2021", 32 pgs.
"U.S. Appl. No. 15/993,914, Non Final Office Action dated Oct. 5, 2021", 8 pgs.
"Chinese Application Serial No. 201880048175.6, Office Action dated Sep. 16, 2021", With English translation, 10 pgs.
"European Application Serial No. 18810465.7, Response filed Nov. 8, 2021 to Extended European Search Report Apr. 9, 2021", 44 pgs.
"European Application Serial No. 18809615.0, Response Filed Feb. 23, 2022 to Extended European Search Report Jul. 27, 2021", 26 pgs.
"U.S. Appl. No. 15/993,914, Response filed Mar. 29, 2022 to Non Final Office Action Oct. 5, 2021", 11 pgs.
"Chinese Application Serial No. 202110936034.1, Voluntary Amendment filed Mar. 10, 2022", With English claims, 10 pgs.
"Chinese Application Serial No. 201880048175.6, Response filed Apr. 1, 2022 to Office Action Sep. 16, 2021", w English claims, 34 pgs.
"U.S. Appl. No. 15 993,914, Ex Parte Quayle Action mailed May 20, 2022", 6 pgs.
"Chinese Application Serial No. 202210367249.0, Notification to Make Rectification Jun. 23, 2022", With English translation, 3 pgs.
"U.S. Appl. No. 15/993,914, Response filed Aug. 19, 2022 to Ex Parte Quayle Action mailed May 20, 2022", 10 pgs.
"Chinese Application Serial No. 202110936034.1, Office Action Jul. 29, 2022", w English translation, 11 pgs.
"U.S. Appl. No. 15/993,914, Notice of Allowance Sep. 14, 2022", 8 pgs.
"Chinese Application Serial No. 202111515691.5, Voluntary Amendment filed Aug. 3, 2022", w English Claims, 8 pgs.
"U.S. Appl. No. 15/993,914, Supplemental Notice of Allowability dated Sep. 30, 2022", 2 pgs.
"U.S. Appl. No. 15/993,914, Supplemental Notice of Allowability dated Dec. 2, 2022", 2 pgs.
"European Application Serial No. 22184045.7, Response filed Sep. 29, 2022 to Invitation to Remedy Deficiencies (R. 58 EPC) mailed", 7 pgs.
"European Application Serial No. 22184045.7, Extended European Search Report dated Dec. 6, 2022", 7 pgs.
"U.S. Appl. No. 15/993,914, Supplemental Notice of Allowability dated Dec. 21, 2022", 2 pgs.
"Chinese Application Serial No. 202110936034.1, Response filed Feb. 13, 2023 to Office Action dated Jul. 29, 2022", w English claims, 10 pgs.
"European Application Serial No. 22184045.7, Response filed Jul. 27, 2023 to Extended European Search Report dated Dec. 6, 2022", 27 pgs.

\* cited by examiner ns, according to some example embodiments.
AUTOMATED FOOTWEAR LACING SYSTEMS, DEVICES, AND TECHNIQUES

PRIORITY APPLICATIONS

This application is a divisional application of U.S. patent application Ser. No. 15/8993,914, filed May 31, 2018, now U.S. Pat. No. 11,559,108, which application claims the benefit of priority to U.S. Provisional Patent Application Ser. No. 62/513,213, filed May 31, 2017, the contents of which are incorporated by reference herein in their entireties.

FIELD OF THE INVENTION

The following specification describes various aspects of a footwear assembly involving a lacing system including a motorized or non-motorized lacing engine, footwear components related to the lacing engines, automated lacing footwear platforms, and related concepts. More specifically, much of the following specification describes various aspects of lacing engine architectures (configurations) for use in footwear including motorized or non-motorized automated lace tightening. The specification also discusses related concepts, such as battery charging devices, storage and delivery packaging, as well as footwear user interfaces.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Figure 1:
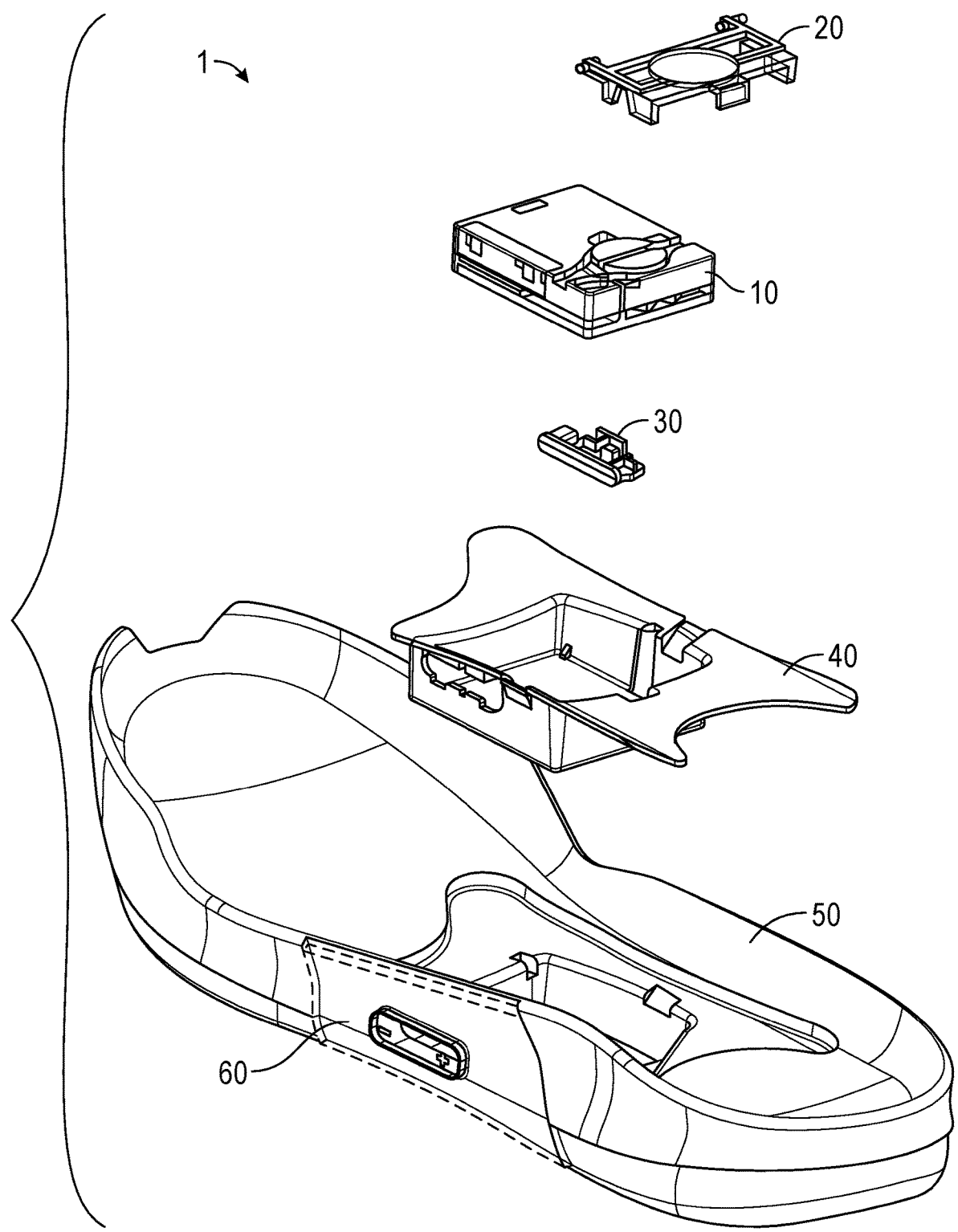
FIG. 1 is an exploded view illustration of components of a portion of a footwear assembly with a motorized lacing system, according to some example embodiments.

Any headings provided herein are merely for convenience and do not necessarily affect the scope or meaning of the terms used or discussion under the heading.

DETAILED DESCRIPTION

The concept of self-tightening shoe laces was first widely popularized by the fictitious power-laced Nike® sneakers worn by Marty McFly in the movie Back to the Future II, which was released back in 1989. While Nike® has since released at least one version of power-laced sneakers similar in appearance to the movie prop version from Back to the Future II, the internal mechanical systems and surrounding footwear platform employed do not necessarily lend themselves to mass production and/or daily use. Additionally, other previous designs for motorized lacing systems comparatively suffered from problems such as high cost of manufacture, complexity, assembly challenges, and poor serviceability. The present inventors have developed various concepts to deliver a modular footwear platform to accommodate motorized and non-motorized lacing engines that solves some or all of the problems discussed above, among others. In order to fully leverage the modular lacing engine discussed briefly below and in greater detail in co-pending application Ser. No. 15/450,860, titled "LACING APPARATUS FOR AUTOMATED FOORWEAR PLATFORM," the present inventors developed various alternative and complementary lacing engine designs, battery chargers, user interface concepts, and display/carrying cases discussed herein.

The motorized lacing engine discussed below in reference to FIG. 1, as well as alternative concepts discussed throughout, was developed from the ground up to provide a robust, serviceable, and inter-changeable component of an automated lacing footwear platform. The lacing engine includes unique design elements that enable retail-level final assembly into a modular footwear platform. The lacing engine design allows for the majority of the footwear assembly process to leverage known assembly technologies, with unique adaptions to standard assembly processes still being able to leverage current assembly resources.

In an example, the modular automated lacing footwear platform includes a mid-sole plate secured to the mid-sole for receiving a lacing engine. The design of the mid-sole plate allows a lacing engine to be dropped into the footwear platform as late as at a point of purchase. The mid-sole plate, and other aspects of the modular automated footwear platform, allow for different types of lacing engines to be used interchangeably. For example, the motorized lacing engine discussed below could be changed out for a human-powered lacing engine. Alternatively, a fully automatic motorized lacing engine with foot presence sensing or other optional features could be accommodated within the standard mid-sole plate.

Utilizing motorized or non-motorized centralized lacing engines to tighten athletic footwear presents some challenges in providing sufficient performance without sacrificing some amount of comfort. Lacing architectures discussed herein have been designed specifically for use with centralized lacing engines and are designed to enable various footwear designs from casual to high-performance.

This initial overview is intended to introduce the subject matter of the present patent application. It is not intended to provide an exclusive or exhaustive explanation of the various inventions disclosed in the following more detailed description.

Automated Footwear Platform

The following discusses various components of the automated footwear platform including a motorized lacing engine, a mid-sole plate, and various other components of the platform. While much of this disclosure focuses on lacing architectures for use with a motorized lacing engine, the discussed designs are applicable to a human-powered lacing engine or other motorized lacing engines with additional or fewer capabilities. Accordingly, the term "automated" as used in "automated footwear platform" is not intended to only cover a system that operates without user input. Rather, the term "automated footwear platform" includes various electrically powered and human-power, automatically activated and human activated mechanisms for tightening a lacing or retention system of the footwear.

FIG. 1 is an exploded view illustration of components of a motorized lacing system for footwear, according to some example embodiments. The motorized lacing system 1 illustrated in FIG. 1 includes a lacing engine 10, a lid 20, an actuator 30, a mid-sole plate 40, a mid-sole 50, and an outsole 60. FIG. 1 illustrates the basic assembly sequence of components of an automated lacing footwear platform. The motorized lacing system 1 starts with the mid-sole plate 40 being secured within the mid-sole. Next, the actuator 30 is inserted into an opening in the lateral side of the mid-sole plate opposite to interface buttons that can be embedded in the outsole 60. Next, the lacing engine 10 is dropped into the mid-sole plate 40. In an example, the lacing system 1 is inserted under a continuous loop of lacing cable and the lacing cable is aligned with a spool in the lacing engine 10 (discussed below). Finally, the lid 20 is inserted into grooves in the mid-sole plate 40, secured into a closed position, and latched into a recess in the mid-sole plate 40. The lid 20 can capture the lacing engine 10 and can assist in maintaining alignment of a lacing cable during operation.

In an example, the footwear article or the motorized lacing system 1 includes or is configured to interface with one or more sensors that can monitor or determine a foot presence characteristic. Based on information from one or more foot presence sensors, the footwear including the motorized lacing system 1 can be configured to perform various functions. For example, a foot presence sensor can be configured to provide binary information about whether a foot is present or not present in the footwear. If a binary signal from the foot presence sensor indicates that a foot is present, then the motorized lacing system 1 can be activated, such as to automatically tighten or relax (i.e., loosen) a footwear lacing cable. In an example, the footwear article includes a processor circuit that can receive or interpret signals from a foot presence sensor. The processor circuit can optionally be embedded in or with the lacing engine 10, such as in a sole of the footwear article.

Figure 2:
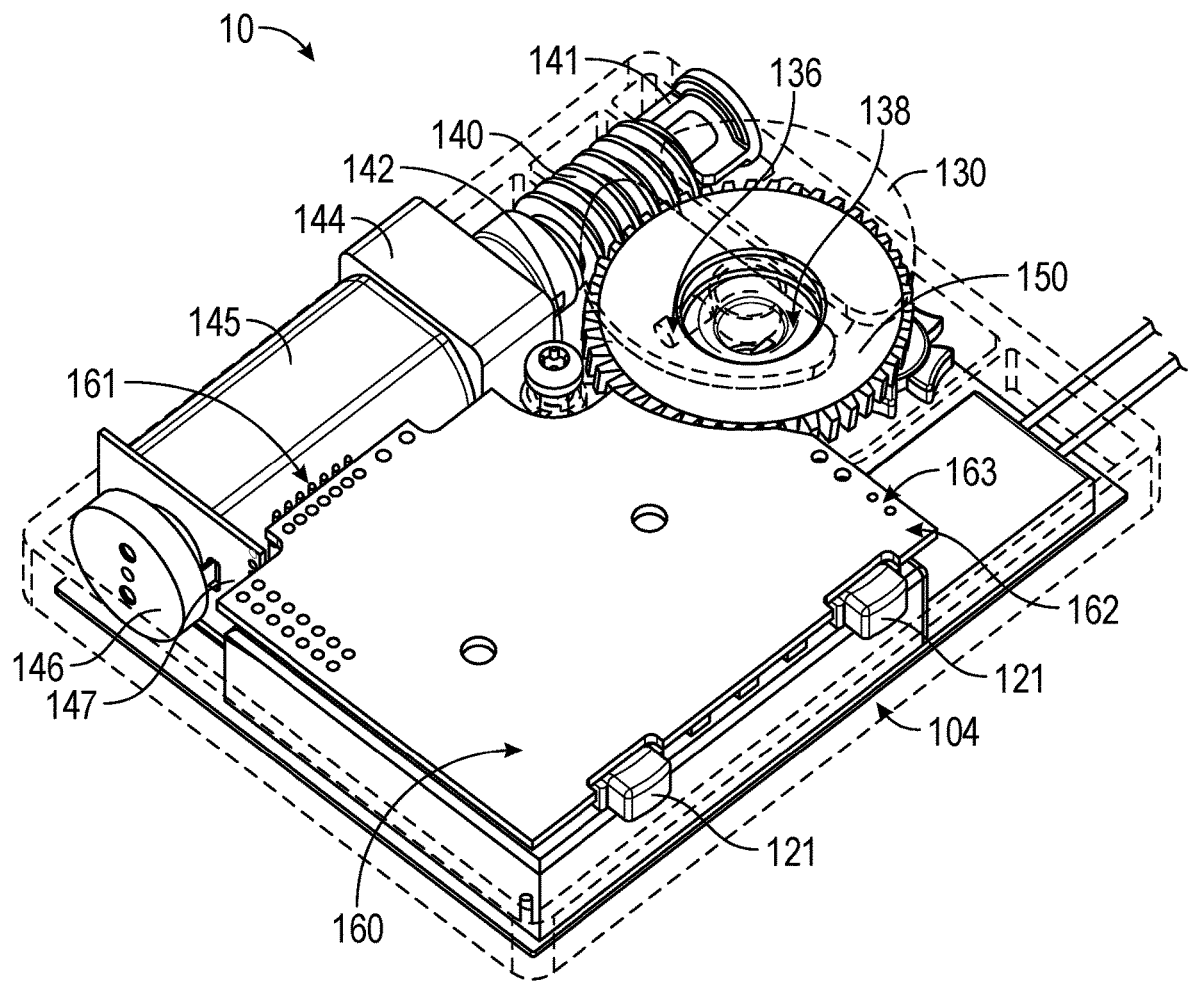
FIG. 2 is a perspective view of an example lacing engine, according to some example embodiments.

FIG. 2 is an illustration of various internal components of lacing engine 10, according to example embodiments. FIG. 2 also illustrates how a load cell can be incorporated into a lacing engine, such as lacing engine 10. In this example, the lacing engine 10 further includes spool magnet 136, O-ring seal 138, worm drive 140, bushing 141, worm drive key 142, gear box 144, gear motor 145, motor encoder 146, motor circuit board 147, worm gear 150, circuit board 160, motor header 161, battery connection 162, and wired charging header 163. The spool magnet 136 assists in tracking movement of the spool 130 though detection by a magnetometer (not shown in FIG. 2C). The o-ring seal 138 functions to seal out dirt and moisture that could migrate into the lacing engine 10 around the spool shaft 133. In this example, the load cell can be incorporated outboard of bushing 141 to detect forces transmitted from the spool 130 through the worm gear 150 onto the worm drive 140. Information from the load cell can be used as an input to the tension control to tighten or loosen lace tension based on an inference on activity level being experienced by the footwear. For example, if the load cell is detecting frequent shock loading on the laces, it can be inferred that activity level of high (e.g., engaged in basketball game). Alternatively, if the load cell is detecting little or no shock loading, then the lacing engine can infer low activity level and potentially loosen the laces.

In this example, major drive components of the lacing engine 10 include worm drive 140, worm gear 150, gear motor 145 and gear box 144. The worm gear 150 is designed to inhibit back driving of worm drive 140 and gear motor 145, which means the major input forces coming in from the lacing cable via the spool 130 are resolved on the comparatively large worm gear and worm drive teeth. This arrangement protects the gear box 144 from needing to include gears of sufficient strength to withstand both the dynamic loading from active use of the footwear platform or tightening loading from tightening the lacing system. The worm drive 140 includes additional features to assist in protecting the more fragile portions of the drive system, such as the worm drive key 142. In this example, the worm drive key 142 is a radial slot in the motor end of the worm drive 140 that interfaces with a pin through the drive shaft coming out of the gear box 144. This arrangement prevents the worm drive 140 from imparting any axial forces on the gear box 144 or gear motor 145 by allowing the worm drive 140 to move freely in an axial direction (away from the gear box 144) transferring those axial loads onto bushing 141 and the housing structure 100. As noted above, the arrangement also allows for convenience placement of a load cell outboard of the bushing 141 to measure axial forces on the drive training from laces.

Planetary Gear Train Lacing Engine

Figure 3A:
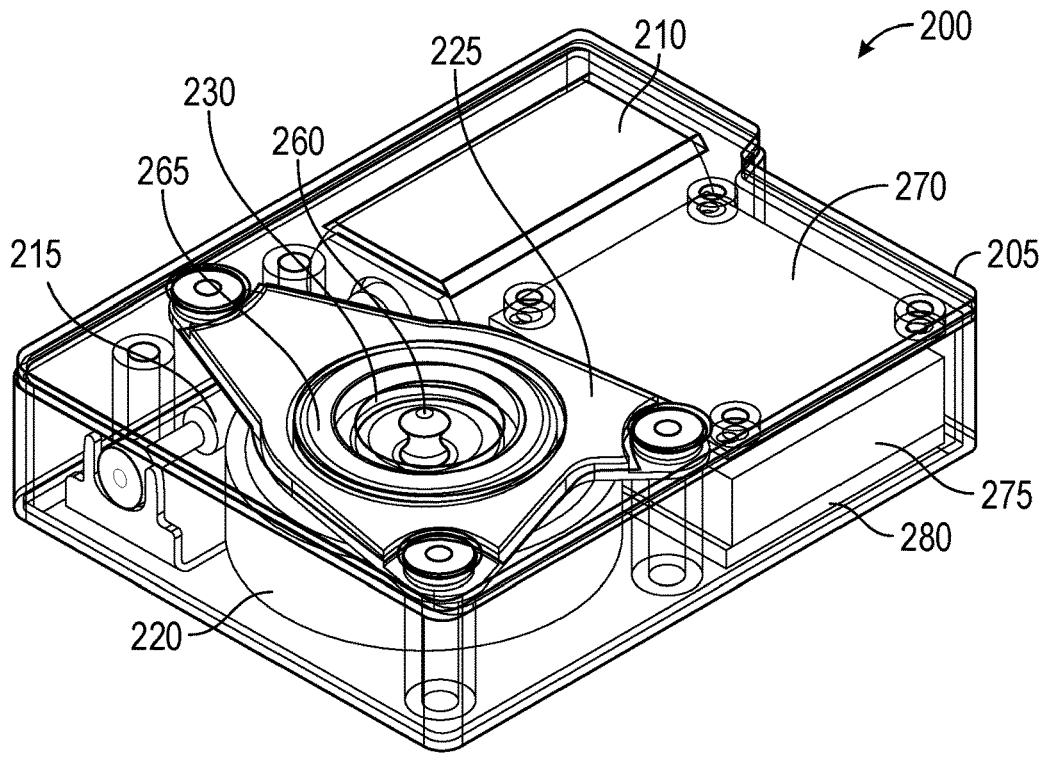
FIG. 3A is an isometric view of an example lacing engine, according to some example embodiments.
Figure 3B:
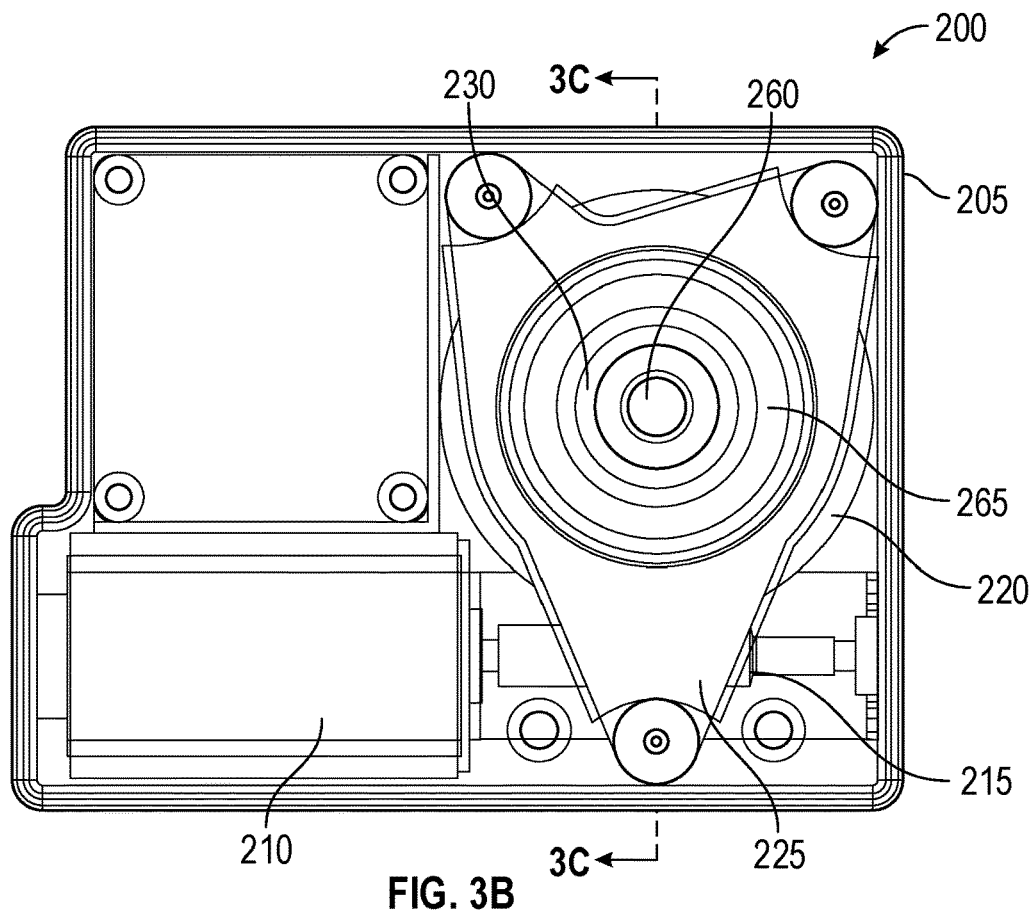
FIG. 3B is a top view of an example lacing engine, according to some example embodiments.
Figure 3C:
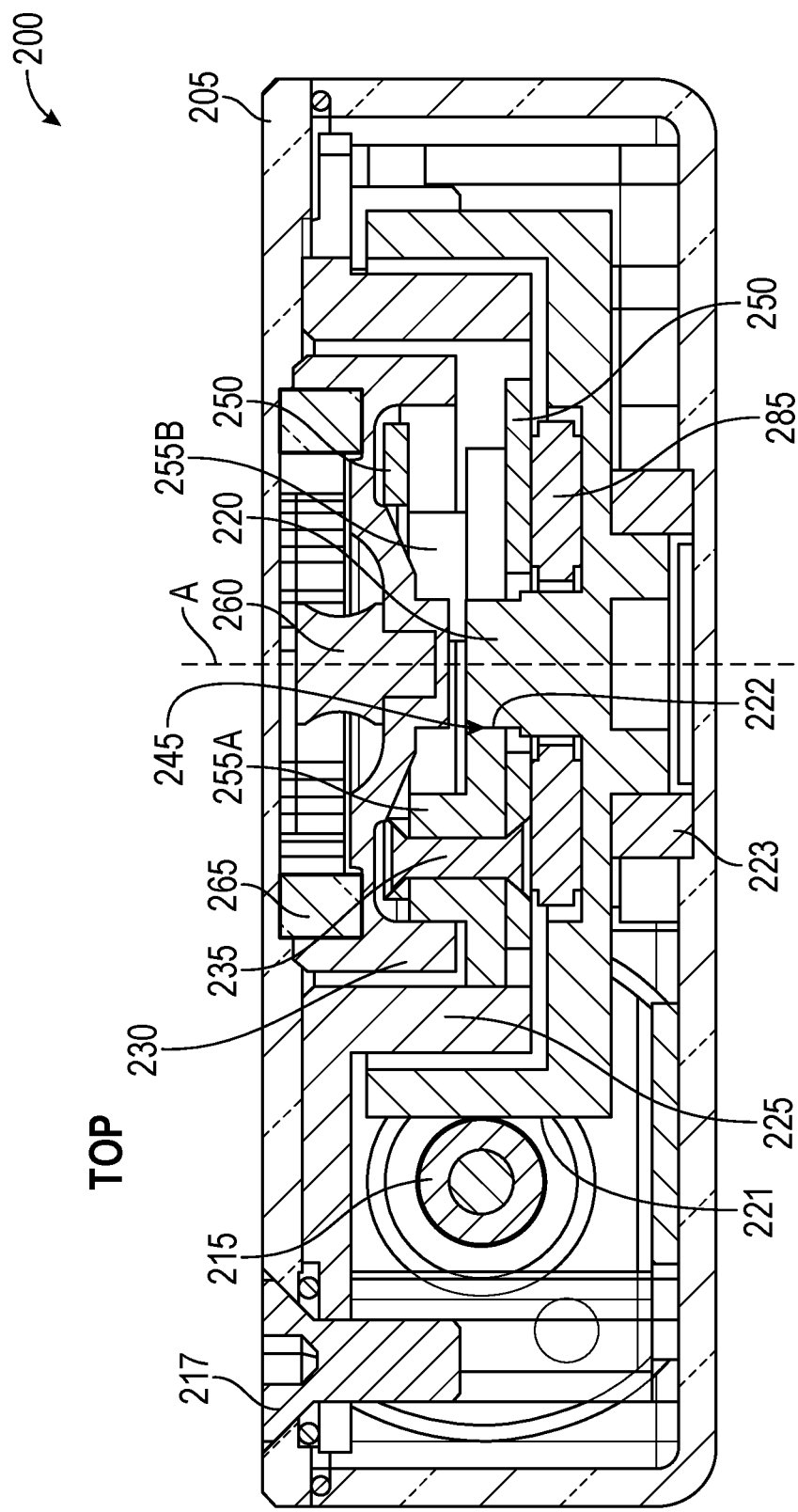
FIG. 3C is a cross-sectional side view across section A-A of FIG. 3B of an example lacing engine, according to some example embodiments.
Figure 3D:
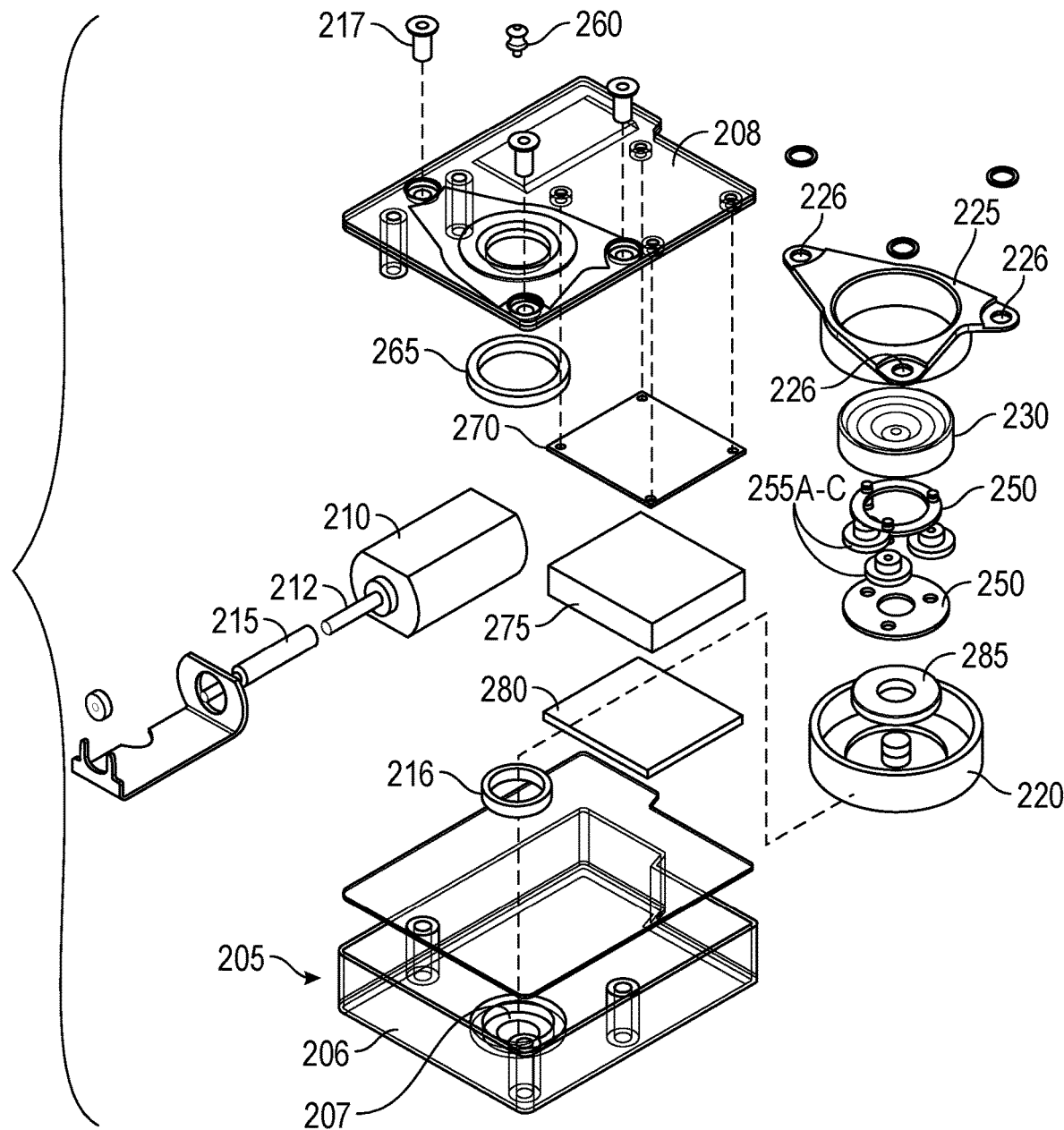
FIG. 3D is an exploded isometric view of an example lacing engine, according to some example embodiments.

FIG. 3A is an isometric view of lacing engine 200, according to some example embodiments. FIG. 3B is a top view of lacing engine 200, according to some example embodiments. FIG. 3C is a cross-sectional side view across section A-A of FIG. 3B of lacing engine 200, according to some example embodiments. FIG. 3D is an exploded isometric view of lacing engine 200, according to some example embodiments. FIGS. 3A-3D are discussed below concurrently.

FIGS. 3A-3D are diagrams illustrating a planetary gear based lacing engine, according to some example embodiments. In this example, the planetary gear based lacing engine 200 can include a housing 205 (including a base 206 and a lid 208), a motor 210 (including a shaft 212), a worm drive 215, a sun gear bearing 216, fasteners 217, a sun gear 220 (including outer teeth 221 and inner teeth 222), a stationary ring gear 225 (including flanges 226), a rotating ring gear 230, a pin 235, a pair of plates 250, planet gears 255A-255C (not shown in FIGS. 3A and 3B and only two visible in FIG. 3C), a second planet gear 255B, a spool 260, a ring gear bearing 265, a printed circuit board (PCB) 270, a battery 275, a charge coil 280, and a thrust bearing 285. Also shown in FIG. 3B are section markers A-A. Also shown in FIG. 3C are central axis A and orientation indicators Top and Bottom.

In this example, a planetary gear system can be driven by the worm gear of the shaft interfacing with the sun gear to drive the spool. The planetary gear system can provide a compact (dense) and high-ratio package (large gear reduction). The example design can balance radial forces and allow primarily torsional stresses on components. Any of the previously discussed lacing engines can be modified to include a planetary gear drive train. The details of this example are discussed further below.

The housing 205 can be a rigid or semi-rigid body comprised of materials such as metals, plastics, foams, elastomers, ceramics, composites, and combinations thereof. The housing 205 can include the base 206 sized and shaped to receive the drive train (the motor 210, the gears, the bearings, etc.), the PCB 270, the battery 275, and the charge coil 280 therein. The base 206 can include a recess 207 at a bottom of the base 206. The lid 208 can be sized and shaped to be received on and partially in the body 206 to enclose the components within the base 206.

The motor 210 can be an electric motor, in one example, electrically powered by the battery 275 to provide rotational output through the shaft 212. The worm drive 215 can be secured to the shaft 212 and can be rotatable therewith. In some examples, the shaft 212 can be a worm gear and in some examples, the worm drive 215 can be releasably or fixedly coupled to the shaft 212.

Fasteners 217 can be fasteners of many kinds such as screws, rivets, pins, nails, and the like. In other examples, fasteners 217 can be replaced with other means of fastening such as adhesives, welding, snap-fit, and the like.

Each of the sun gear 220, the rotating ring gear 230, and the planet gears 255A-255C can be gears. That is, each of the sun gear 220, the rotating ring gear 230, and the planet gears 255A-255C can be rigid or semi-rigid members each rotatable about an axis and each configured to engage another member to transfer torque and therefore rotation. Each of these gears can include teeth that can be spur, bevel, worm, helical, or the like.

The sun gear 220 can include outer teeth 221 and inner teeth 222. The sun gear 220 can rotate relative to the housing 205 on the sun gear bearing 216 where the sun gear bearing 216, and in some examples part of the sun gear 220, can be located in the recess 207 of the base 206 of the housing 205 where the sun gear 220 can rotate thereabout.

In some examples, the sun gear 220 can be a worm wheel. That is, the sun gear 220 can include an outer flange having a height relatively larger than that of the central hub or central gear portion, thus striking a resemblance to a wheel. In some examples, the outer teeth 221 of the worm wheel can be of a worm-type and can be configured to engage the worm drive 215 of the shaft 212 and can receive rotation and torque therefrom. The inner teeth 222 can extend radially outward from a center portion or hub of the sun gear having a substantially smaller diameter than the outer portion or outer flange that includes the outer teeth 221. In this way, the sun gear 220 can provide a relatively large gear ratio or gear reduction.

The planet gears 255A-255C can be relatively small gears configured to interface with the inner teeth 222 of the sun gear while rotating about the central axis A of the sun gear. Together, the planet gears 255A-255C can transfer rotation and torque to the rotating ring gear 230. The planet gears 255A-255C can be held together by the pair of plates 250. In some examples, each of the planet gears 255A-255C can receive the pin 235 therethrough, where each of the pins 235 can be secured to the plates 250 on both sides of each of the planet gears 255A-255C to help fix relative positions of the planet gears 255A-255C while still allowing the planet gears 255A-255C to rotate about their respective pins 235. The thrust bearing 285 can engage the sun gear 220 and one of the plates 250 to space the plates 250 and the planet gears 255A-255C relative to the sun gear 220. Though three of planet gears 255A-255C are discussed and shown, fewer or more planet gears can be used in lacing engine 200. For example, 1, 2, 4, 5, 6, 7, 8, 9, 10, or the like planet gears can be used.

The rotating ring gear 230 can be a single gear coaxial with the central axis A and configured to engage each of the planet gears 255A-255C. The rotating ring gear 230 can be disposed within the stationary ring gear 225 and can be rotatable within and relative to the stationary ring gear 225. The rotating ring gear 230 can be coupled to the spool 260 at a substantially central portion of the rotating ring gear 230. In other examples, the spool 260 can be connected to other portions of the rotating ring gear 230. The spool 260 can be a bobbin, reel, or cylinder configured to wind and retain a portion of a lace of a footwear article. In some examples, the spool 260 can be connected to the rotating ring 230 to be rotated therewith. The spool 260 can be replaced with a lace spool similar to lace spool 130, or an alternative design that meets the lace take-up requirements of the lacing engine design.

The stationary ring gear 225 can be a stationary gear insertable into the base 206 of the housing 205. In some examples, the stationary ring gear 225 can extend from the top of the base 206 toward the bottom and can engage the planet gears 255A-255C, where the planet gears 255A-255C each engage inner teeth of the stationary ring gear 225 and to rotate about a central portion of the sun gear 220. In some examples, the stationary ring gear 225 can extend toward the bottom to engage the sun gear 220 or a bearing separating the sun gear 220 and the stationary ring gear 225 to allow relative rotation therebetween.

The stationary ring gear 225 can include a plurality of flanges 226, where each of the flanges 226 extends radially outward toward a periphery of the lid 208. Each flange 226 can be configured to receive a fastener therethrough, such as one of fasteners 217 to secure the stationary ring gear to the lid 208 and to the base 206. The flanges 226 can be placed for stability while balancing volumetric optimization of the other components within the housing 205.

The ring gear bearing 265 can be a bearing configured to engage the rotating ring gear and the lid 208 to retain the ring gear 230 (and other components) within the base 206 of the housing 205 and to allow rotation of the ring gear 230 relative to the housing 205.

The printed circuit board (PCB) 270 can be an integrated circuit board configured to support and electrically connect components, including transistors and circuits of any of multiple forms known in the industry, and can be configured to provide conductive structures and contacts to distribute signals. In some examples, the PCB 270 can be a programmable controller, such as a single or multi-board computer, or a direct digital controller (DDC). In other examples, the PCB 270 can be any relatively small computing device including a processor with or without wireless communication capabilities.

The battery 275 can be configured to store power received from charge coil 280, which can be distributed to thereafter to the PCB 270 and motor 210. In some examples, battery 275 can be a replaceable battery, and the like. The charge coil 280 can be, in some examples, an inductive charging coil configured to interact with an inductive charger to supply the battery 275 with an electric charge for storage and/or use.

In operation of some examples, the battery 275 can be charged by the charge coil 280. When a lacing event is called for, the PCB 270 can transfer (or can instruct the battery to transfer) power to the motor 210 to rotate the shaft 212. When the shaft 212 rotates, so too does the worm drive 215. Because the worm drive 215 interfaces with the sun gear (or worm wheel) 220 (specifically outer teeth 221 of the sun gear 220), rotation of the worm drive 215 drives rotation of the sun gear 220 about the central axis A.

The sun gear 220, being engaged with each of planet gears 255A-255C via inner teeth 222, can transfer rotation to each of planet gears 255A-255C to cause each of planet gears 255A-255C to rotate about a central portion or hub of the sun gear 220. The planet gears 255A-255C can transfer the rotation further to the rotating ring gear 230 and the spool 260 to drive winding of a lace during the lacing event. Such rotation of the spool 260 can continue until the PCB 270 issues a command to stop rotation of the shaft 212, which stops rotation of the sun gear, the planet gears 255A-255C, the rotating ring gear 230, and the spool 260. A position of the spool 260 can be held after a lacing event, for example during use of the footwear article until a loosening event occurs. In some examples, the position of the spool 260 can be held because an interface between the worm drive 215 and the outer teeth 220 of the worm wheel cannot operate in a reverse direction of rotation, thus acting as a mechanical lock for retention of tension dynamics without an additional mechanism for this purpose, which can help save cost and reduce complexity of the lacing engine 200.

Because, at least in part, of the nesting of the gears (such as the planet gears 255A-255C within the sun gear 220), the planetary gear system of the lacing engine 200 can provide a compact (dense) lacing engine for a footwear article that is resilient and reliable. Though the lacing engine 200 is relatively small, the planetary gear system can help to offer a high-ratio package (large gear reduction) drivetrain to help obtain a desired lacing speed and torque.

Further, because multiple planet gears, such as the three planet gears 255A-255C, are used within lacing engine 200, the load can distributed between three parts. This can be important because the planet gears 255A-255C can be the smallest and/or most breakable parts of the lacing engine 200. Therefore, by dividing the load, failure of the planet gears 255A-255C can be reduced.

By positioning rotating ring gear 230 near a top of the lacing engine (and therefore away from a bottom of the footwear article), mounting of the ring gear 230 through the base 206 can be easier and impact to the rotating ring gear 230 and the spool 260 due to user-caused housing deflection can be reduced. For example, point-loading to the housing 206 can be caused by rock or stone strikes to the housing 206 during use. These strikes are most likely to occur on the bottom of the housing 206, away from the spool 260 and the rotating ring gear 230. Also, a large portion of the mounting interface of the lacing engine (such as stationary ring gear 225 and its flanges 226) occurs at a top portion of the housing, away from the stresses and forces of deflection events discussed above. Further, because the sun gear bearing 216 mounts to sun gear 220 at recess 207 in a single bearing mount point in the bottom of base 206 of housing 205, the drive train can be substantially isolated from deflection of the housing 205.

Also, because of the relative positioning of the sun gear 220, the worm drive 215, and the PCB 270, a motor encoder (such as the motor encoder 146) can be easily integrated and positioned within the housing to provide proper and low latency control feedback of the motor 210, which can improve operation of the lacing engine 200.

This example design of the lacing engine 200 can balance delivery of radial forces and speed reduction and helping to allow primarily torsional stresses on components while still providing a relatively low lacing time using a planetary gear train that can provide good rotational stiffness and can distribute load among planets and ring gears.

Power Spring Lacing Engine

Figure 4A:
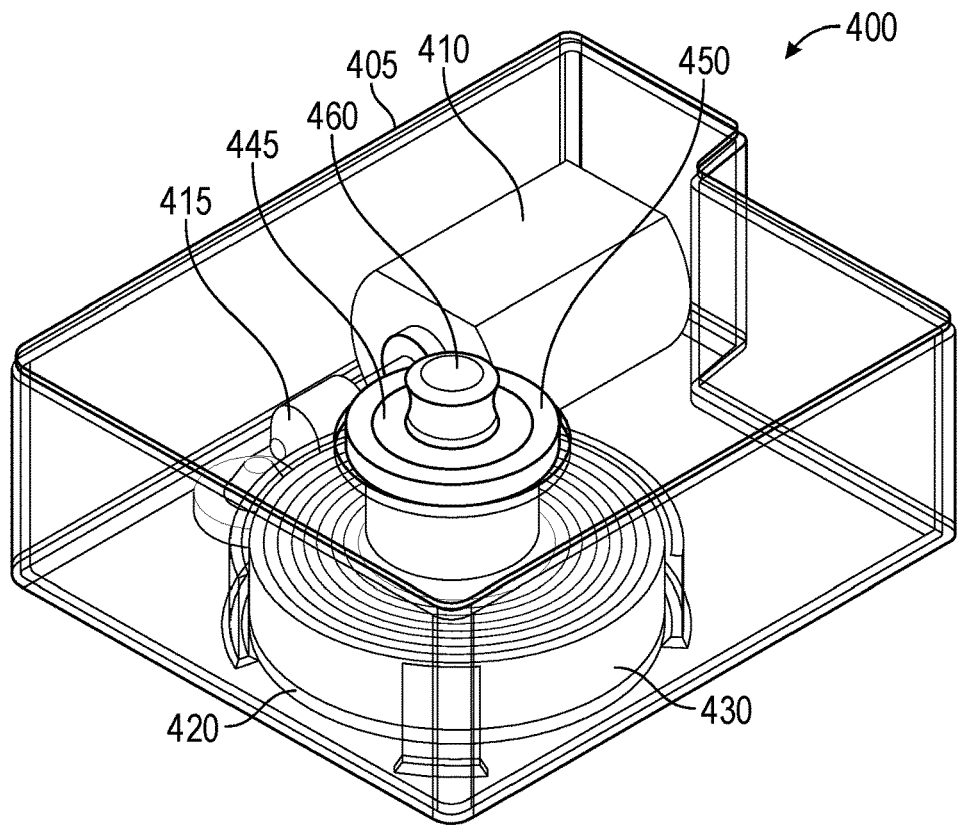
FIG. 4A is an isometric view of an example lacing engine, according to some example embodiments.
Figure 4B:
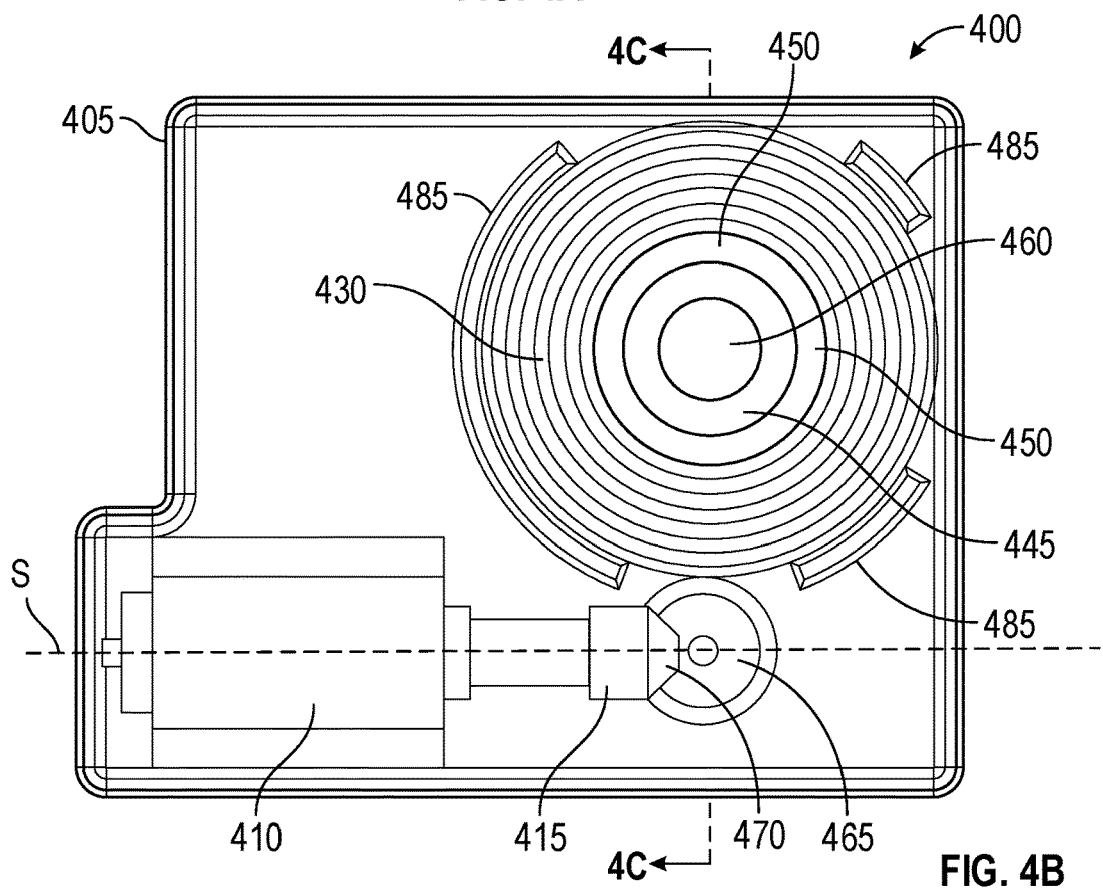
FIG. 4B is a top view of an example lacing engine, according to some example embodiments.
Figure 4C:
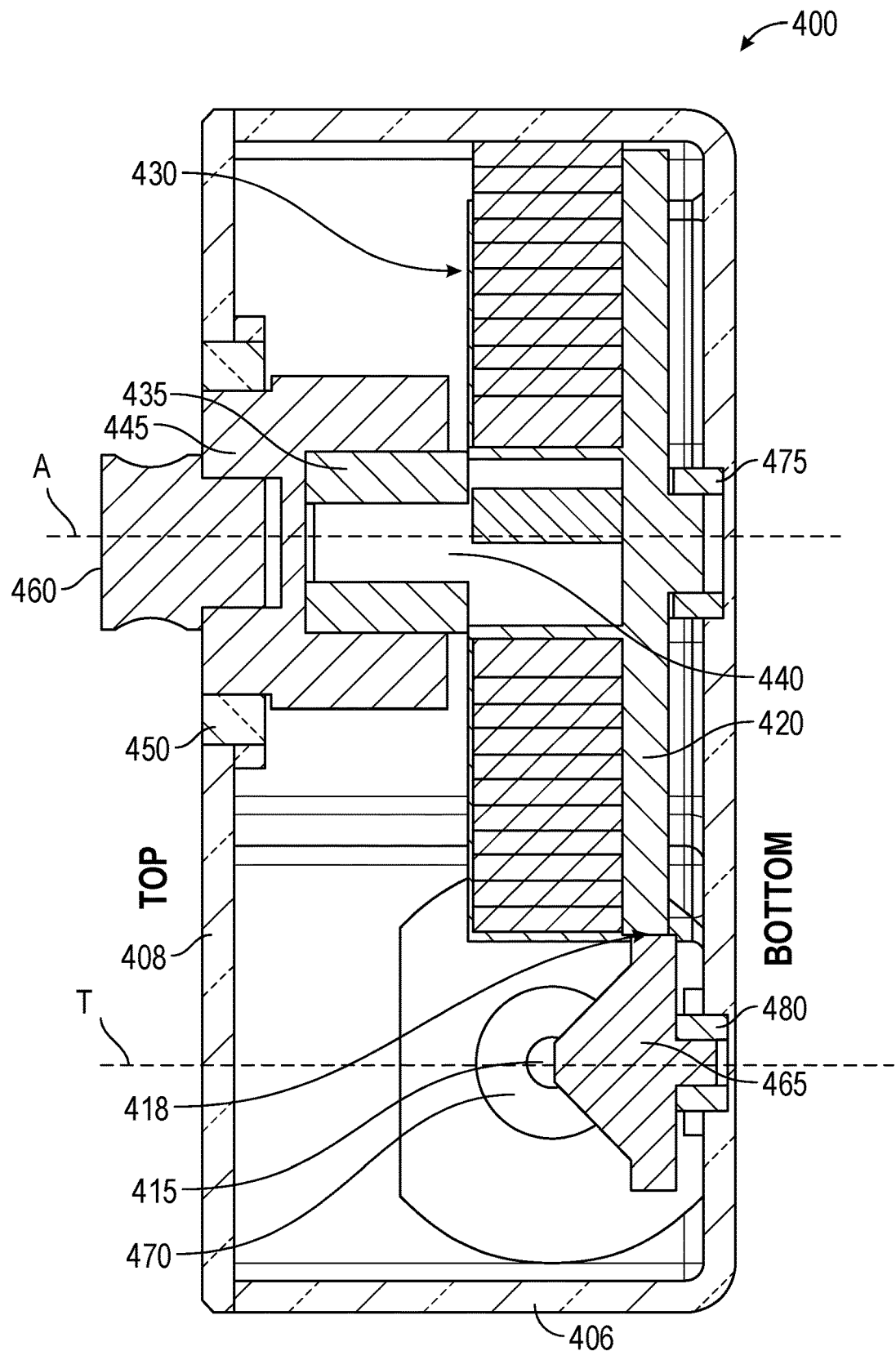
FIG. 4C is a cross-sectional side view across section A-A of FIG. 4B of an example lacing engine, according to some example embodiments.

FIG. 4A is an isometric view of lacing engine 400, according to some example embodiments. FIG. 4B is a top view of lacing engine 400, according to some example embodiments. FIG. 4C is a cross-sectional side view across section A-A of FIG. 4B of lacing engine 400, according to some example embodiments.

FIGS. 4A-4C are diagrams illustrating a power spring based lacing engine, according to some example embodiments. In this example, the power spring based lacing engine 400 can include a housing 405 (including a base 406 and a lid 408), a motor 410 a shaft 415, a spring arbor 420, a power spring 430, a clutch 435, a stem 440, a coupler (spool arbor) 445, a coupler bearing 450, a spool 460, a driven gear 465, a driving gear 470, a spring arbor bearing 475, and a driven gear bearing 480. Also shown in FIG. 4B are section markers A-A and shaft axis S. Also shown in FIG. 4C are central axis A, transverse axis T, and orientation indicators Top and Bottom. In some examples, lacing engine 400 can also include a printed circuit board (PCB), a battery, and a charge coil.

In this example, a power spring lacing engine can be driven by the motor to rotate the power spring to store energy in the power spring. The power spring can selectably and controllably release stored energy to the coupler to rotate the spool during a lacing event and the power spring can be rotated to store energy between lacing events. The power spring system can use a low quantity of small parts to provide a compact, quiet, and cost-effective lacing engine. Any of the previously discussed lacing engines can be modified to include a power spring drive train. The details of this example are discussed in further detail below. Accordingly, alternative lace spool designs can be incorporated into the lacing engine 400 discussed below.

The housing 405 can be a rigid or semi-rigid body comprised of materials such as metals, plastics, foams, elastomers, ceramics, composites, and combinations thereof. The housing 405 can include the base 406 sized and shaped to receive the drive train (the motor 410, the gears, the bearings, the spring, etc.), the PCB, the battery, and the charge coil therein. The base 406 can include recesses at a bottom of the base 406 to receive bearings 475 and 480 therein. The lid 408 can be sized and shaped to be received on and partially in the body 406 to enclose the components within the base 406.

The motor 410 can be an electric motor, in one example, electrically powered by the battery to provide rotational output through the shaft 415. The shaft 415 can be releasably or fixedly coupled to the driving gear 470, which can be engaged with the driven gear 465. In some examples, each of the driven gear 465 and the driving gear 470 can be conical gears, or gears having a geometric shape substantially of a cone.

In some examples, the driven gear 465 and the driving gear 470 can be conical gears, such as bevel gears. For example, the driving gear can rotate about the drive axis S and the driven gear can rotate about the transverse axis T, which can be substantially transverse to the drive axis S and substantially parallel to the central axis A. In this example, the driving gear 470 can be rotated by the shaft 415 of the motor 410 to rotate the driven gear 465 about the transverse axis T. In some examples, the driven gear 465 can be supported by and rotatable relative to the driven gear bearing 480, where the driven gear bearing 480 can be secured to the bottom of the housing 405, in some examples.

The spring arbor 420 can be a rotating arbor, coupler, chuck, or the like. The spring arbor 420 can be supported by the spring arbor bearing 475, which can be secured to the bottom of the housing 405, in some examples. In some examples, the spring arbor bearing 475 and the driven gear bearing 480 can be journal bearings, ball bearings, needle bearings, or the like. The stem 440 can be a rigid body secured to the power spring 430 and secured to the clutch 435. In some examples, the stem 440 can be supported by the spring arbor 420 and rotatable relative thereto. In some examples, the spring arbor 420 can controllably engage and disengage the driven gear 465 to selectively transfer torque to the power spring 430 from the motor 410, as discussed below in further detail.

The power spring 430 can be a biasing or resilient element configured to store potential energy. The power spring 430 can be made of materials such as metals, polymers, or the like. In some examples, the power spring 430 can be made of spring steel. In some examples, the power spring 430 can be a coil spring, a torsion spring, a wound spring, or the like. The power spring 430 can be supported and connected to the spring arbor 420, where the spring arbor can be engaged with the driven gear 465 to rotate the spring arbor 420 and therefore the power spring 430.

The clutch 435 can be a mechanical or electromechanical clutch configured to selectively transfer rotation therethrough. In an example where the clutch 435 is electromechanical, the clutch 435 can transfer rotation (and torque) in response to a control signal from the PCB. In some examples, the clutch 435 can be a ratcheting clutch to help limit reverse rotation of the stem 440 (and therefore of the power spring 430).

The coupler (spool arbor) 445 can be a rotating arbor, coupler, chuck, or the like. The coupler 445 can, in some examples, be coupled to the spool 460 and the clutch and can be engaged with the coupler bearing 450. In some examples, the coupler 445 can be configured to selectively couple to the spool 460. In some examples, when the spool 460 is connected to the coupler (spool arbor) 445, the spool 460 can be rotated therewith. The coupler bearing 450 can be a bearing secured to the lid 408 of the housing. The coupler bearing 450 can be engaged with the coupler 445 to help limit non-rotational moving of the coupler 445 (and therefore of the clutch 435 and the stem 460). The spool 460 can be a bobbin, reel, or cylinder configured to wind and retain a portion of a lace of a footwear article.

In general operation of some examples, the battery can be charged by the charge coil, which can be controlled by the PCB to transfer power to the motor 410 to rotate the shaft 415. When the shaft 415 rotates, so too does the driving gear 470. Because the driving gear 470 interfaces with the driven gear 465, the driving gear 470 drives the driven gear 465 to rotate about the transverse axis T.

Rotation of the driven gear 465 can drive rotation of the spring arbor 420 about the central axis A. Because the spring arbor 420 can be secured to the drive spring 430, rotation of the spring arbor 420 can wind the drive spring 430 (and the stem 440). When the drive spring 430 is un-coupled from the spool 460, the drive spring 430 can store mechanical (and rotational) potential energy therein. When a lacing event is called for, the PCB can send a signal to the clutch to couple the stem 440 to the spool 460 to transfer rotation from the power spring 430, through the stem 440, to the coupler 445, and to the spool 460 to drive winding of a lace during the lacing event. Such rotation of the spool 460 can continue until the PCB issues a command to stop rotation of the spool 460, which can, in some examples, disengage the clutch (disengage the stem 440 from the spool), or in other examples, hold a position of the spool 460 and the power spring 430. During use of the footwear article, the position of the spool 460 can be held until a loosening event occurs.

The lacing engine 400 can also operate in various stages of lacing. In some examples, the clutch 435 allows for the power spring and the spool 460 to operate independently. For example, the spool 460 can be coupled and uncoupled by the coupler 445 and the spring 430 can be coupled and uncoupled to the motor 410 by the spring arbor 420. For example, when the lace is loose, the power spring 430 can be loaded where the spool 460 is held in place and is not coupled to the power spring 430 while the spring arbor 420 engages the driven gear 365 while the power spring 430 is wound or tightened by the motor 410. After winding of the power spring 430, the spool 460 can be coupled to the power spring 430 (via the clutch 435 and the stem 440) and the spool 460 can be held in place by the coupler 445 as the spring arbor 420 can be held in place by the driven gear 465. When a foot is detected in the footwear article or otherwise during a lacing event, the spool 460 can be coupled to the power spring 430 and the power spring 430 can be released from the motor 410 by the spring arbor 420 to allow the power spring 430 to rotate the spool 460 to tighten the lace.

Also, during an adjustment of increased lace tension, the power spring 430 can be first loaded by decoupling the spool 460 from the power spring 430 and holding the spool 460 in place with the coupler 445 while the power spring 430 is coupled to the motor 410 via the spring arbor 420 engaging the driven gear 465 so that the motor 410 can wind the power spring 430. In some examples, winding can be skipped during an adjustment. In either case, when the power spring 430 is wound, the spool 460 can be coupled to the power spring 430 and the power spring 430 can be released from the motor 410 and the spool 460 can be released from the coupler 445 to transfer torque from the power spring 430 to the spool 460 to tighten the lace. When an adjustment command to loosen the lace occurs, the spool 460 can remain coupled to the power spring and the lace can be manually loosened.

During wearing of the footwear article and when the lace is to be held tight, the spool 460 can be held (by the coupler 445) while the spool 460 is coupled to the power spring 430 by the clutch 435 and while the spring arbor 420 is engaged with the driven gear 465 to prevent loosening. When a loosen event occurs the spool 460 can be released and the power spring 430 can be released.

In some examples, the stem 440 can include an additional clutch to be selectively couple the stem 440 to the power spring 430. In other examples, the coupler 445 can include a clutch or clutching mechanism to selectively couple the coupler 445 to the spool 460. In one example, the clutch of the coupler 445 can be released during a loosening event to allow the spool to spin freely so that the lace can be loosened.

In some examples, the clutch 435 can include a mechanism for reversing a rotational direction of the coupler 445 and therefore of the spool 460 to selectively transmit rotation provided by the power spring 430 in either rotational direction to the spool 460. This can allow the power spring 430 to drive the spool 460 to selectively tighten or loosen the lace. In other examples, the clutch 435 can include a mechanism to allow winding of the spring 430 through the spool 460 via the stem 440 such that a manual unlacing event can wind the spring, which can further increase time between charges and/or can decrease a size of the battery.

In some examples, the power spring 430 can be sized to power multiple lacing events. For example, the power spring 430 can be sized to power 2, 5, 10, 15, 20, or the like lacing events. Because the lacing engine 400 provides an ability to store potential mechanical energy for one or more lacing events, the lacing engine 400 can store additional power for lacing events beyond the electrical power capacity of the battery by winding the power spring 430 and fully charging the battery. Also, in some examples, where the power spring 430 can store enough mechanical power for multiple lacing events, a battery may be eliminated from the lacing engine, saving materials and cost.

Because the power spring 430 can power the lacing even without the use of the motor 410, the lacing event can be relatively quiet. Also, because the power spring 430 can be wound outside of a lacing event (i.e. before the lacing event), the motor can be operated more efficiently (e.g. at a lower speed for a longer period of time) to help reduce consumption of power.

In some examples, the coupler 445 can be configured to operate as a clutch to selectively provide torque from the power spring 430 to the spool 460. In these examples, the coupler 445 can couple to one or more of the stem 440 and to the spool 460, and can uncouple from one or more of the stem 440 and to the spool 460 to allow for individual rotation of both.

Figure 4D:
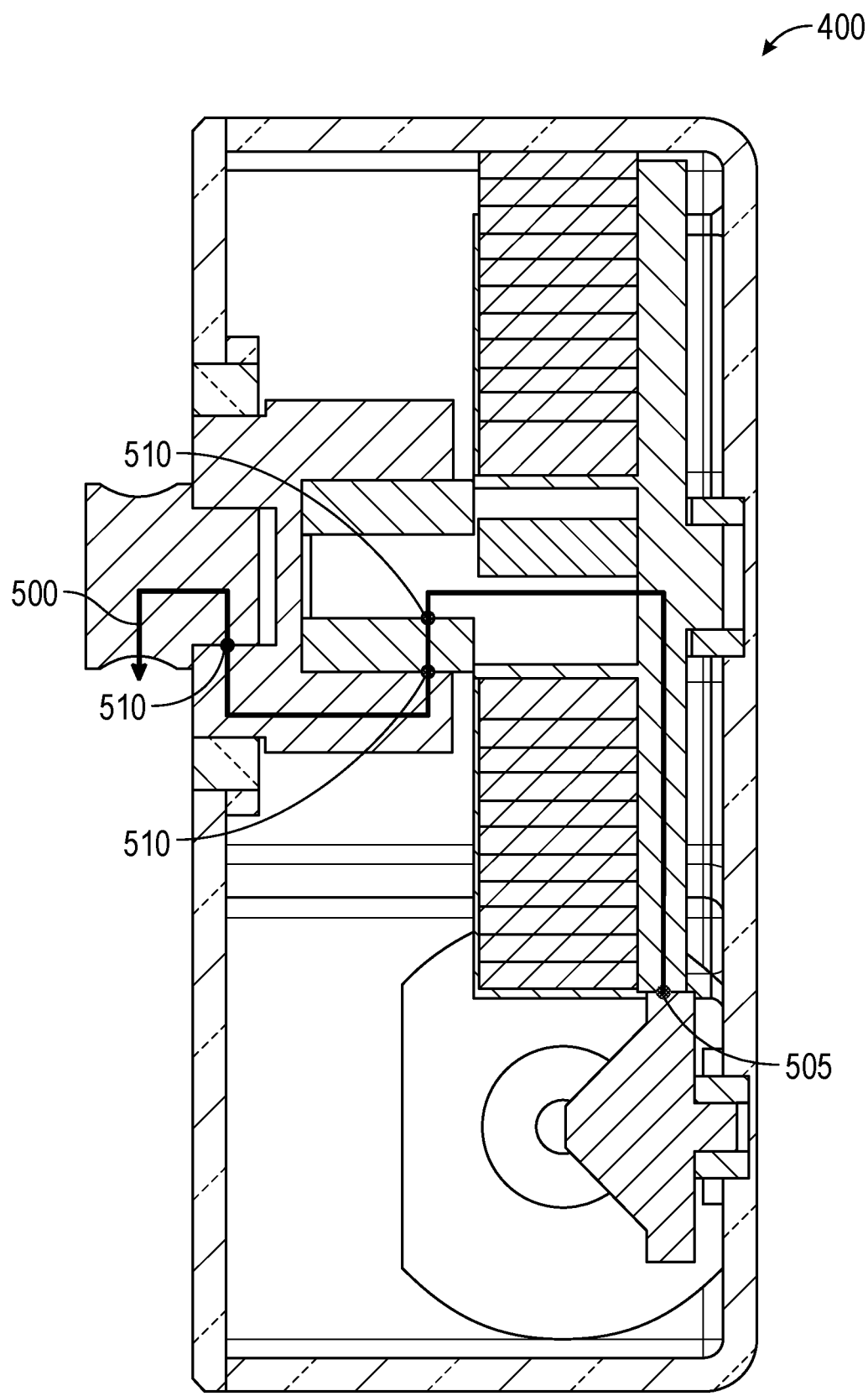
FIG. 4D is a cross-sectional side view across section A-A of FIG. 4B of an example lacing engine, according to some example embodiments.

FIG. 4D is a cross-sectional side view across section A-A of FIG. 4B of lacing engine 400, according to some example embodiments. The components of the lacing engine 400 of FIG. 4D can be consistent with those of FIGS. 4A-4C discussed above, where FIG. 4D further shows a path for transfer of rotational energy (torque) from the driven gear to the lace.

In the example shown in FIG. 4D, torque can be transferred from the drive train, for example, from the motor 410 through the driven gear 465 to the spring arbor 420 at connection 505 with a speed reduction. The spring arbor 420 can transfer torque through the power spring 435 to the stem 440 and directly at connections 510 to the clutch 435 (when the clutch 435 is engaged), the coupler 445, and to the spool 460. In some examples, when the power spring 430 is fully wound, this transfer of torque can be direct. In other examples, this transfer can be delayed by winding of the power spring 430. The overall power (torque) transfer path 500 is illustrated in FIG. 4D.

EXAMPLES

The following, non-limiting examples, detail certain aspects of the present subject matter to solve the challenges and provide the benefits discussed herein, among others.

Example 1 is a lacing engine for an automated footwear platform, the lacing engine comprising: a housing securable within a footwear article; and a drivetrain located at least partially within the housing, the drivetrain comprising: a motor including a shaft rotatable within the housing; a sun gear driven by the shaft to rotate about a central axis of the sun gear; a planet gear engaged with and driven to rotate by the sun gear; a rotating ring gear engaged with and driven by the planetary gear to rotate about the central axis; and a spool secured to the ring gear and rotatable therewith, the spool configured to control a lace of the footwear article and to wind the lace as the ring gear rotates in a first direction.

In Example 2, the subject matter of Example 1 optionally includes wherein the sun gear includes: an outer set of teeth engaged with the shaft and driven thereby; and an inner set of teeth driven to rotate coaxially with the outer set of teeth, the planetary gear engaged with and driven by the inner set of teeth.

In Example 3, the subject matter of any one or more of Examples 1-2 optionally include a plurality of planetary gears including the planet gear, each planetary gear of the plurality of planetary gears engageable with and driven by the inner set of teeth.

In Example 4, the subject matter of any one or more of Examples 2-3 optionally include wherein the sun gear comprises a worm wheel.

In Example 5, the subject matter of Example 4 optionally includes wherein the plurality of planetary gears are located within the worm wheel.

In Example 6, the subject matter of any one or more of Examples 2-5 optionally include wherein the shaft includes a worm drive engageable with the outer set of teeth of the worm wheel to rotate the sun gear in response to rotation from the motor.

In Example 7, the subject matter of any one or more of Examples 1-6 optionally include a ring gear bearing engaged with the ring gear.

In Example 8, the subject matter of Example 7 optionally includes wherein the housing further comprises a lid securable to a base of the housing, the lid engageable with the ring gear bearing to axially retain the ring gear and the ring gear bearing within the housing.

In Example 9, the subject matter of Example 8 optionally includes a stationary ring gear, the rotating ring gear disposable within the stationary ring gear and rotatable relative to the stationary ring gear, the lid securable to the stationary ring gear to limit movement of the stationary ring gear relative to the housing, and the stationary ring gear engageable with the sun gear to limit axial movement of the sun gear relative to the housing.

In Example 10, the subject matter of Example 9 optionally includes wherein the stationary ring gear includes a plurality of mounting flanges securable to the lid, each flange extending radially outward from a body of the stationary ring gear, each of the flange configured to receive a fastener to secure the stationary ring gear to the lid.

In Example 11, the subject matter of any one or more of Examples 1-10 optionally include a pair of plates surrounding the planet gear; and a pin extending through the planet gear and the pair of plates to retain the planet gear between the pair of plates, the planet gear rotatable about the pin.

In Example 12, the subject matter of Example 11 optionally includes a thrust bearing engaged with one plate of the pair of plates and with a first side of the sun gear.

In Example 13, the subject matter of Example 12 optionally includes wherein the housing includes a recess configured to receive at least a portion of the sun gear therein.

In Example 14, the subject matter of Example 13 optionally includes a sun gear bearing at least partially disposable in the recess of the housing, the bearing engageable with a second side of the sun gear.

Example 15 is a lacing engine for an automated footwear platform, the lacing engine comprising: a housing securable within a footwear article; and a drivetrain located at least partially within the housing, the drivetrain comprising: a motor including a shaft rotatable within the housing; a power spring driven by the shaft to rotate about a central axis to deliver stored energy upon activation; a spool rotatable about the central axis, the spool configured to controllably wind a lace of the footwear article; and a clutch configured to controllably couple the power spring to the spool to transfer rotation therebetween.

In Example 16, the subject matter of Example 15 optionally includes wherein the clutch is a ratcheting clutch.

In Example 17, the subject matter of any one or more of Examples 15-16 optionally include a spring arbor connected to the housing and rotatable relative thereto, the spring arbor supporting the power spring, and the spring arbor controllably coupled to the shaft to transfer rotation from the shaft to the power spring.

In Example 18, the subject matter of Example 17 optionally includes a conical driving gear secured to the shaft and rotatable with the shaft about a shaft axis; and a conical driven gear engaged with the conical driving gear and driven to rotate thereby about a transverse axis substantially transverse to the shaft axis, the conical driven gear coupled to the spring arbor to transfer rotation thereto.

In Example 19, the subject matter of any one or more of Examples 15-18 optionally include wherein the power spring is one of a coil spring or a torsion spring.

In Example 20, the subject matter of any one or more of Examples 15-19 optionally include a spool arbor positioned at least partially within the housing and coaxially with the power spring, the spool arbor controllably coupled to the spool and coupled to the clutch, the spool arbor rotatable about the central axis.

In Example 21, the subject matter of any one or more of Examples 15-20 optionally include a stem supported by the spool arbor and coupled to the power spring and to the clutch, the stem configured to be driven by the power spring to rotate relative to the spool arbor.

In Example 22, the subject matter of Example 21 optionally includes a coupler bearing secured to the housing and engaged with the spool arbor limit movement of the spool, the spool arbor, the clutch, and the power spring relative to the housing.

In Example 23, the subject matter of any one or more of Examples 15-22 optionally include wherein the motor is configured to rotate the shaft to drive the power spring to store rotational energy therein, the power spring configured to transfer the rotational energy through the clutch to the spool to wind the lace when the clutch selectively connects the power spring to the spool.

In Example 24, the subject matter of any one or more of Examples 15-23 optionally include wherein the clutch is positioned coaxially with the power spring, In Example 25, the system, device, or method of any one of or any combination of Examples 1-23 is optionally configured such that all elements or options recited are available to use or select from.

Additional Notes

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The disclosure, therefore, is not to be taken in a limiting sense, and the scope of various embodiments includes the full range of equivalents to which the disclosed subject matter is entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method (process) examples described herein, such as the footwear assembly examples, can include machine or robotic implementations at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. An Abstract, if provided, is included to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A lacing engine for an automated footwear platform, the lacing engine comprising:
   a housing securable within a footwear article; and
   a drivetrain located at least partially within the housing, the drivetrain comprising:
   a motor including a shaft rotatable within the housing;
   a power spring driven by the shaft to rotate about a central axis to deliver stored energy upon activation;
   a spring arbor connected to the housing and rotatable relative thereto, the spring arbor supporting the power spring, and the spring arbor controllably coupled to the shaft to transfer rotation from the shaft to the power spring;
   a spool rotatable about the central axis, the spool configured to controllably wind a lace of the footwear article; and
   a clutch configured to controllably couple the power spring to the spool to transfer rotation therebetween.

2. The lacing engine of claim 1, wherein the clutch is a ratcheting clutch.

3. The lacing engine of claim 1, further comprising:
   a conical driving gear secured to the shaft and rotatable with the shaft about a shaft axis; and
   a conical driven gear engaged with the conical driving gear and driven to rotate thereby about a transverse axis substantially transverse to the shaft axis, the conical driven gear coupled to the spring arbor to transfer rotation thereto.

4. The lacing engine of claim 1, wherein the power spring is one of a coil spring or a torsion spring.

5. The lacing engine of claim 1, wherein the motor is configured to rotate the shaft to drive the power spring to store rotational energy therein, the power spring configured to transfer the rotational energy through the clutch to the spool to wind the lace when the clutch selectively connects the power spring to the spool.

6. The lacing engine of claim 1, wherein the clutch is positioned coaxially with the power spring.

7. A lacing engine for an automated footwear platform, the lacing engine comprising:
   a housing securable within a footwear article; and
   a drivetrain located at least partially within the housing, the drivetrain comprising:
   a motor including a shaft rotatable within the housing;
   a power spring driven by the shaft to rotate about a central axis to deliver stored energy upon activation;
   a spool rotatable about the central axis, the spool configured to controllably wind a lace of the footwear article;
   a clutch configured to controllably couple the power spring to the spool to transfer rotation therebetween; and
   a spool arbor positioned at least partially within the housing and coaxially with the power spring, the spool arbor controllably coupled to the spool and coupled to the clutch, the spool arbor rotatable about the central axis.

8. The lacing engine of claim 7, further comprising:
   a stem supported by the spool arbor and coupled to the power spring and to the clutch, the stem configured to be driven by the power spring to rotate relative to the spool arbor.

9. The lacing engine of claim 8, further comprising:
   a coupler bearing secured to the housing and engaged with the spool arbor limit movement of the spool, the spool arbor, the clutch, and the power spring relative to the housing.

10. A lacing engine for an automated footwear platform, the lacing engine comprising:
    a housing insertable within a portion of a footwear article; and
    a drivetrain located within the housing, the drivetrain comprising:
    a motor including a shaft rotatable within the housing;
    a power spring driven by the shaft to rotate about a central axis to deliver stored energy upon activation;
    a spool rotatable about the central axis, the spool configured to receive a lace of the footwear article;
    a clutch selectively couplable to the power spring to the spool to transfer rotation therebetween;
    a printed circuit board (PCB) containing circuitry to control portions of the drivetrain; and
    a battery,
    wherein the clutch is an electromechanical clutch and receives power from the battery.

11. The lacing engine of claim 10, wherein the PCB controls activation of the electromechanical clutch.

12. The lacing engine of claim 10, wherein the PCB controls transfer of battery power to the motor.

* * * * *